United States Patent [19]

Klotzbach

[11] 4,227,581
[45] Oct. 14, 1980

[54] GROUND PREPARING APPARATUS FOR NO-TILL PLANTING

[76] Inventor: Harry A. Klotzbach, 7380 Macomber Rd., Oakfield, N.Y. 14125

[21] Appl. No.: 905,582

[22] Filed: May 15, 1978

[51] Int. Cl.³ ............................................. A01B 49/06
[52] U.S. Cl. ................................. 172/142; 172/166; 172/502; 172/149; 111/85
[58] Field of Search ............... 172/142, 157, 166, 177, 172/180, 421, 149, 462, 686, 502; 111/59, 62, 63, 66, 85

[56] References Cited

U.S. PATENT DOCUMENTS

| | | | |
|---|---|---|---|
| 3,177,828 | 4/1965 | Cramer | 172/677 |
| 3,299,965 | 1/1967 | Sokolik | 172/142 |
| 3,314,386 | 4/1967 | Kopaska | 172/142 X |
| 3,523,585 | 8/1970 | Godbersen | 172/421 |
| 3,752,238 | 8/1973 | Chilton | 172/180 |
| 3,912,019 | 10/1975 | Baughman | 172/142 |

OTHER PUBLICATIONS

"Innovative New York Farmer Makes No-Till Work" Article appearing in Trojan X-tra Feb. 1975, p. 6.

*Primary Examiner*—Richard J. Johnson
*Attorney, Agent, or Firm*—Christel, Bean & Linihan

[57] ABSTRACT

Ground preparing apparatus for seed planting comprising a frame adapted to be drawn along a field by a tractor or the like connected to the leading end of the frame and with a planting machine connected to the trailing end of the frame. A colter disc rotatably carried by the frame penetrates the ground to form a slit in the ground and cut stalks and like debris. A pair of laterally and longitudinally spaced narrow tooth elements carried by the frame between the colter disc and the trailing end of the frame penetrate the ground on opposite sides of the slit and cut the ground to form a band-like region of ground prepared to receive seeds and the like dispensed by the planter. A pair of wheels rotatably connected to the frame contact the ground and are located between the tooth elements and the trailing end of the frame and are laterally spaced from the band-like region for controlling the depth of penetration of the colter disc and tooth elements into the ground. The frame includes a first assembly connected at opposite ends to the tractor and planter, respectively, and a second assembly carrying the colter disc, teeth and wheels and held by the first frame assembly through flexible couplings. The leading end of the second frame assembly is connected to the first assembly in a manner permitting a degree of movement of the end of the second assembly substantially perpendicular to the ground.

10 Claims, 8 Drawing Figures

GROUND PREPARING APPARATUS FOR NO-TILL PLANTING

BACKGROUND OF THE INVENTION

This invention relates to the art of agricultural machinery, and more particularly to a new and improved apparatus for preparing a field for the planting of seed.

One area of use of the present invention is in preparing a field for the planting of corn, although the principles of the present invention can be variously applied. In preparing a field for seed planting it has been the usual practice first to plow or turn over the ground, then to drag or otherwise break up the plowed chunks of ground and then finally to traverse the field with a seed planter. The foregoing procedure requires traversing the field with tractor-drawn machines and implements at least three times resulting in a considerable expenditure of fuel and time. The no-till method consequently was developed whereby soil preparation and seed planting are performed during a single traversing of the field with planting and soil conditioning equipment, and the no-till method results in savings of fuel, time, moisture and soil.

Equipment for no-till planting heretofore has included a tractor-drawn seed planter provided with a relatively wide rippled or fluted colter mounted forwardly of the planter for each row and which serves to prepare the ground prior to introduction of seed and possibly also fertilizer by the planter. This arrangement works well in uniformly soft soil conditions but is unsatisfactory for no-till planting on fields having relatively hard soil and/or non-uniform soil conditions.

SUMMARY OF THE INVENTION

It is, therefore, a primary object of this invention to provide a new and improved ground preparing apparatus for no-till planting.

It is a further object of this invention to provide a new and improved ground preparing apparatus for no-till planting particularly suitable for use in hard soil conditions and under non-uniform soil conditions.

It is a further object of this invention to provide such ground preparing apparatus which is effective in operation and relatively easy to use.

It is a further object of this invention to provide such ground preparing apparatus which is relatively economical to manufacture and maintain.

The present invention provides apparatus for preparing ground for seed planting adapted to be drawn over along a field by a tractor or similar vehicle along with and forwardly of a planting machine, the apparatus comprising a frame, a colter disc rotatably carried by the frame near the leading end thereof, a pair of narrow tooth elements carried by the frame rearwardly of the colter disc and spaced laterally and longitudinally, and at least one ground contacting wheel element rotatably connected to the frame. The colter disc penetrates the ground in a manner forming a slit in the ground in a direction substantially parallel to the direction of travel of the apparatus along the field, and the colter disc cuts plant stalks and like debris during formation of the slit. The tooth elements penetrate the ground on opposite sides of the slit formed by the colter disc and cut the ground in a manner forming a band-like region of ground prepared to receive particulate matter including seed dispensed by the planting machine. Preferably a pair of ground contacting wheel elements are provided and are located rearwardly of the tooth elements and forwardly of the trailing end of the frame, are laterally spaced from the band formed by the colter disc and the tooth elements, and control the depth of penetration of the colter disc and tooth elements into the ground. The frame includes a first assembly connected at the leading end to the tractor and connected at the trailing end to the planting machine and also includes a second assembly held by the first assembly and carrying the colter disc, tooth elements and wheel element. The leading end of the second frame assembly is connected to the first assembly in a manner permitting a degree of movement of the leading end of the second assembly substantially perpendicular to the ground.

The foregoing and additional advantages and characterizing features of the present invention will become clearly apparent upon a reading of the ensuing detailed description together with the included drawing wherein:

DETAILED DESCRIPTION OF AN ILLUSTRATIVE EMBODIMENT

Figure 1:
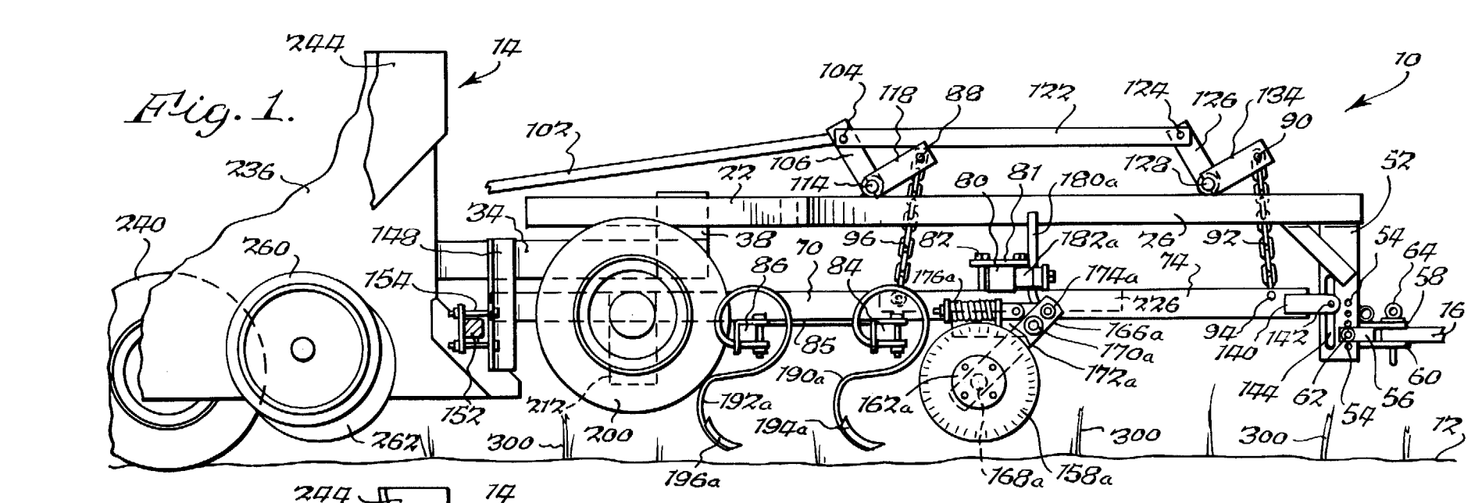
FIG. 1 is a fragmentary side elevational view of the ground preparing apparatus of the present invention in a raised position to facilitate transporting thereof.
Figure 2:
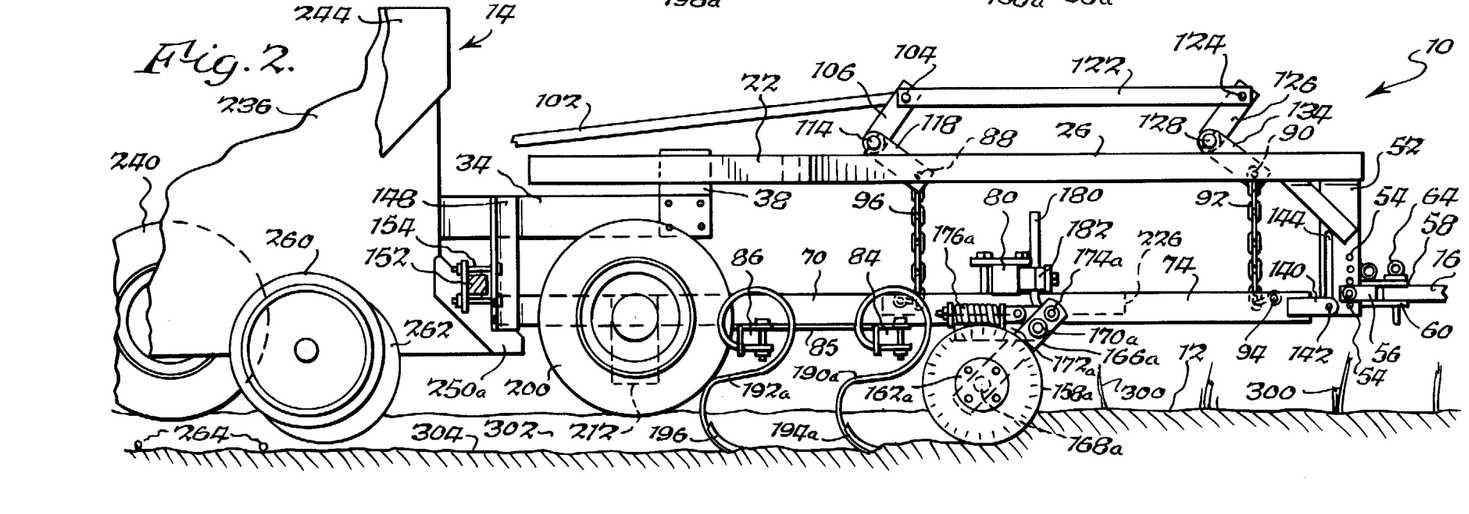
FIG. 2 is a fragmentary side elevational view of the ground preparing apparatus of FIG. 1 in a lowered position during operation.
Figure 3:
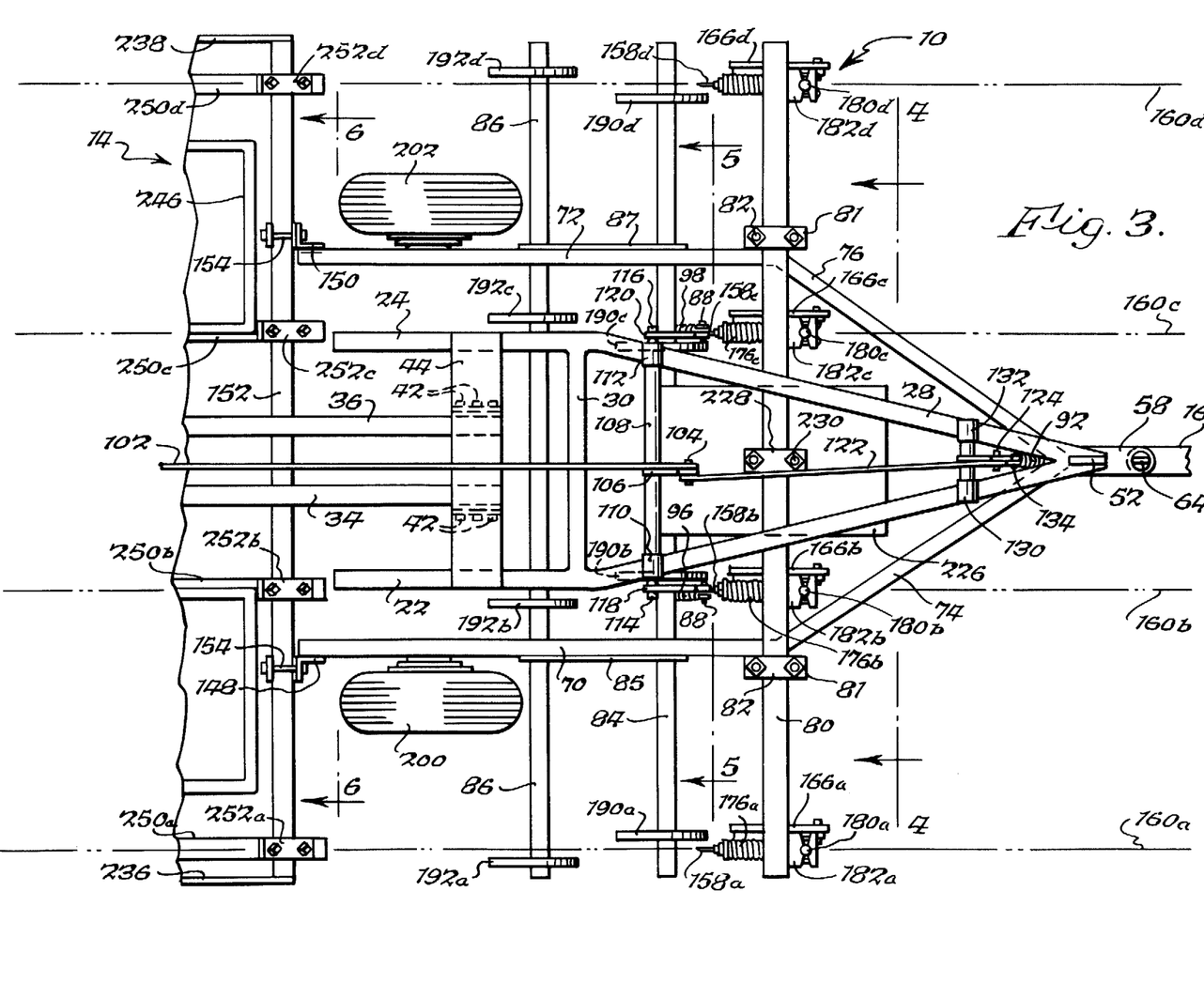
FIG. 3 is a fragmentary top plan view of the apparatus of FIG. 2.
Figure 4:
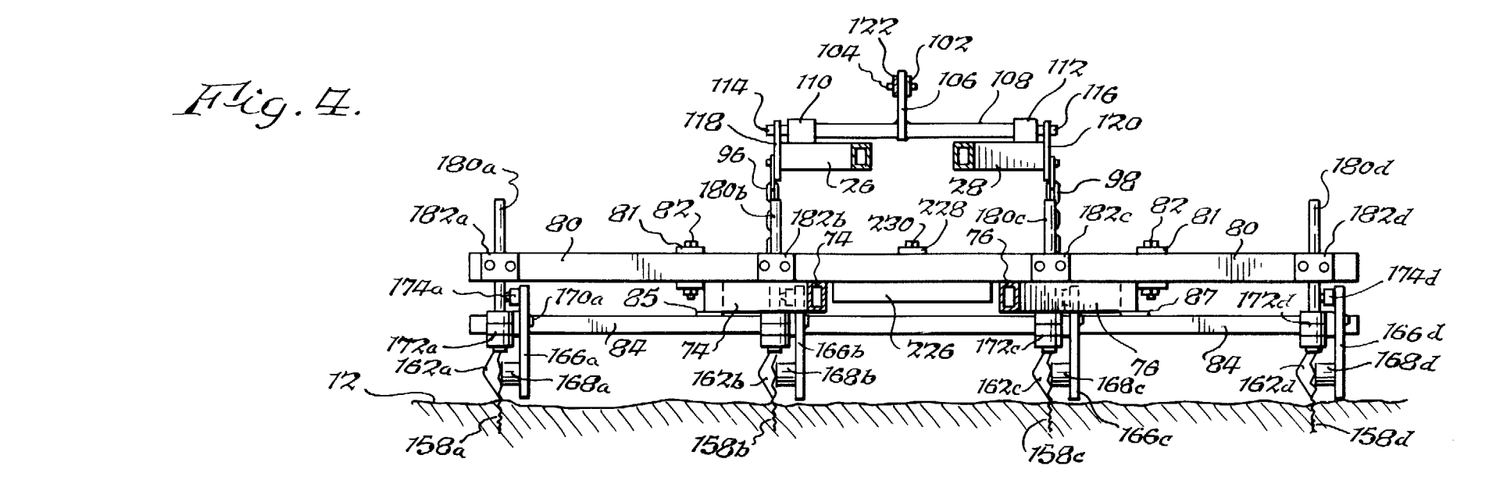
FIG. 4 is an end elevational view with parts removed taken about on line 4—4 of FIG. 3.

Referring now to FIGS. 1–3, there is shown apparatus generally designated 10 for preparing ground for seed planting and adapted to be drawn over along a field having a ground surface designated 12. The apparatus 10 is drawn or pulled by an agricultural vehicle such as a tractor (not shown) along with and forwardly of a planting machine, a portion of which is generally designated 14 in the drawings. In FIG. 1 the apparatus 10 is shown in a raised or elevated position relative to ground 12 to facilitate transporting or moving the apparatus to the field location which is to be prepared for seed planting. FIG. 2 shows the apparatus in a lowered, operative position during use of the apparatus in actual preparation of the ground for seed planting.

The apparatus 10 comprises frame means having a longitudinal axis which is disposed generally parallel to the direction of travel of the combination of tractor, apparatus 10 and planter 14 over along a field. In other words, the longitudinal axis of the frame is generally parallel to the planting rows which are to be prepared and seeded. The frame means has a leading or forward end adapted to be connected to the vehicle, in particular to a draw bar designated 16 which extends rearwardly from the vehicle or tractor, and the frame means includes a trailing or rear end adapted to be connected to the planting machine 14, in particular to the forward end of the machine 14, in a manner which will be described.

Figure 5:
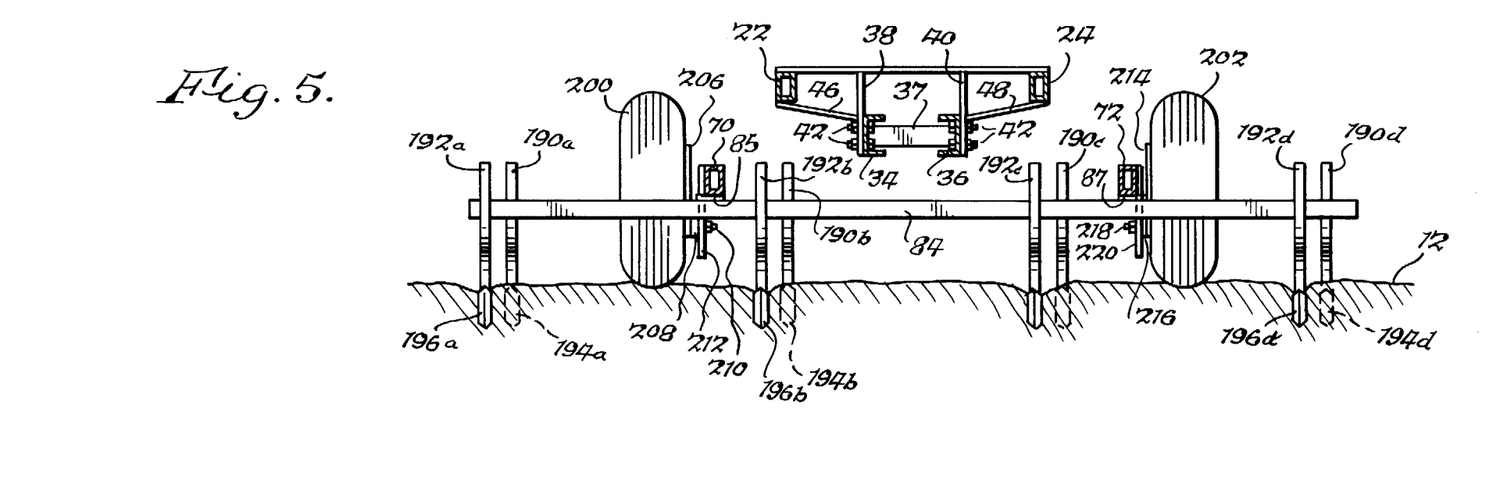
FIG. 5 is an end elevational view with parts removed taken about on line 5—5 of FIG. 3.

The frame means includes a first frame assembly adapted to be connected at one end to the vehicle and at the opposite end to the planting machine 14. In particular, the first frame assembly includes a generally horizontally disposed portion as viewed in FIG. 1 and 2 including a pair of spaced apart, generally parallel elongated side frame sections 22 and 24 also shown in FIG. 3 each having an end or termination facing planting machine 14 and each joining at the opposite end thereof inwardly angularly extending elongated side sections 26 and 28, respectively. A central frame section 30 connects the junction of the sections 22, 26 to the junction of the sections 24, 28. The central section 30 is elongated and disposed at substantially right angles to the sections 22 and 24. The sections 26, 28 meet at a location near the draw bar 16, and the intersection of sections 26, 28 is substantially coincident with the longitudinal axis of the apparatus and the frame means. The first frame assembly is connected at one end in particular at the trailing or rear end, to a pair of connecting members 34, 36 which extend in spaced, parallel relation outwardly from the forward end of the planting machine 14. The structural members 32, 34 which serve as drawbars for the planter 14 can be in the form of channel members as shown in FIG. 5 and are fixed each at one end to the frame of the planting machine 14. A spacing member 37 can be provided therebetween. The outer ends of the drawbars 34, 36 are fixed to a connecting assembly on the first frame as shown in detail in FIG. 5 including a pair of spaced-apart, vertically disposed arm members 38, 40. Drawbars 34 and 36 are secured to arms 38 and 40, respectively, by bolt and nut type fasteners 42 or the equivalent. The arm members 38, 40 in turn depend from a generally horizontal portion 44 of the connecting assembly, the members 38, 40 being welded or otherwise fixed thereto. The horizontal portion 44 is welded or otherwise secured at opposite ends thereof to the frame sections 22, 24. The connecting assembly also can include a pair of brace elements 46, 48 extending outwardly from the members 38, 40 and welded or otherwise fixed at the outer ends thereof to the frame elements 22, 24. By virtue of the foregoing arrangement, the trailing or rear end of the first frame assembly is connected to the forward end of the planting machine 14.

The leading or forward end of the first frame assembly is connected to the rear or trailing end of the tractor or similar vehicle by the following arrangement. A frame member 52 is fixed such as by welding at one end to the forward junction of the frame sections 26, 28. In particular, the bar-like member 52 is fitted into a slot formed in the junction of the frame sections 26, 28 and depends therefrom in a direction substantially perpendicular to the plane of the frame sections 26, 28. Member 52 is provided with a series of apertures 54 in vertically spaced relation therealong. A connector element or hitch includes having a block-like element 56 and a pair of flanges 58, 60 extending in spaced, parallel relation outwardly therefrom. The block 56 is connected to member 52 at selected locations therealong by means of a bolt and nut type fastener 62 or the like at any of the vertical locations provided by the apertures 54. The flanges 56, 58 are spaced apart a distance to accommodate the tractor draw bar 16, and connection is made by means of a pin element 64 which extends through aligned apertures in the flanges 58, 60 and an aperture in the draw bar 16. Other connecting arrangements can of course be employed. By virtue of the foregoing, the leading or forward end of the first frame assembly is connected to the trailing or rear end of the tractor or similar vehicle.

The frame means includes a second frame assembly having a leading or forward end near the trailing or rear end of the tractor or vehicle and a trailing or rear end near the leading or forward end of the planting machine 14. The second frame assembly includes a pair of spaced apart elongated frame sections 70, 72 which are disposed in substantially mutual parallel relation as shown in FIG. 3 and also substantially parallel to the longitudinal axis of the apparatus 10. In the apparatus shown, the frame sections 70, 72 are spaced laterally outwardly of the sections 22, 24 of the first frame assembly. The frame sections 70, 72 each terminate at one end facing the forward or leading end of the planting machine 14. The opposite ends of each of the sections 70 and 72 meets a corresponding one of a pair of inwardly extending frame sections 74 and 76, respectively, which meet at a junction which is substantially coincident with the longitudinal axis of the frame. The second frame assembly is disposed in a plane substantially parallel to the plane of the first frame assembly as shown in FIGS. 1 and 2 and also substantially parallel to the ground surface 12, and the second assembly is located below the first assembly, i.e. between the first assembly and the ground surface 12. The second frame assembly also includes three transverse frame members 80, 84 and 86 spaced at longitudinal intervals along the frame and secured to the frame sections in a suitable manner. Frame member 80 is secured to the junctions of the frame sections 70, 74 and 72, 76 by means of brackets 81 and fasteners 82. Frame member 84 is secured to the frame sections 70, 72 at a location spaced rearwardly of the member 80, and frame member 84 is secured to the frame sections 70, 72 at substantially mid-way in a longitudinal direction along the frame sections 70, 72. Plate-like elements 85, 87 can be provided to facilitate attachment of frame members 84, 86 to the sections 70, 72.

The apparatus of the present invention further comprises holding means connected to the first and second frame assemblies for supporting the second frame assembly by or from the first frame assembly in a manner permitting limited movement of the second frame in a direction toward and away from the ground. The holding means, in turn, includes motive means carried by the first frame assembly and providing output motion in two directions. In particular, the motive means includes an arrangement of lever arms and links driven by a suitable motive power means, for example an hydraulic cylinder, for moving the points designated 88 and 90 in FIGS. 1 and 2 in directions toward and away from the ground surface 12. The holding means further comprises flexible coupling means connected to the output of the motive means and connected to the second frame whereby in response to operation of the motive means the second frame can be raised and lowered relative to the ground 12. In the apparatus shown the flexible coupling means comprises lengths of metal chain, two of which are designated 92 and 96 in FIGS. 1 and 2. In particular, one length of chain 92 is connected at one end to the point 90 and is connected at the other end to a rod or pin 94 extending through the frame sections 74, 76 at or near the forward junction thereof. A pair of chains 96 and 98 are connected each at one end thereof to the point 88 and at the opposite ends thereof to spaced locations on the frame member 82 as shown in FIG. 3. Other flexible couplings can be employed.

The lever arm and link arrangement of the motive means includes a first lever arm 102 which is connected at one end to a suitable source of motive power, for example to the rod of an hydraulic cylinder in a manner which will be described. The opposite end of arm 102 is pivotally connected at 104 to one end of a link element 106, the other end of which is fixed to a rod or tube 108 as shown in FIG. 3 at a location approximately mid-way between the ends thereof. Tube 108, in turn, is disposed generally laterally of the frame and is rotatably held at opposite ends in sleeve-like couplings 110, 112 which, in turn, are fixed to the frame sections 26 and 28, respectively. The opposite ends of tube 108 extend through the couplings 110, 112 and terminate in rod-like elements 114 and 116 which, in turn, are fixed to ends of corresponding link elements 118 and 120, respectively. The opposite ends of the links 118 and 120 are provided with pins or rods which define the point 88 and which are rotatably connected in the links. The pins are connected to the chains 96 and 98. The lever arm and linkage assembly further comprises a second lever arm 122 pivotally connected at one end to point 104 which is pivotally connected to arm 102 and link 106. Lever arm 122 also is pivotally connected at the opposite end at 124 to one end of a link element 126. The opposite end of link 126 is fixed to a tube or cylinder 128 at a location substantially mid-way between the ends thereof. Tube 128 is disposed laterally with respect to frame and is rotatably received at opposite ends in sleeve-like couplings 130, 132 as shown in FIG. 3 which, in turn, are fixed to the frame elements 26 and 28, respectively. Another link element 134 is fixed at one end to the tube 128 and is provided with a pin pivotally connected therein defining the point 90 at the other end which is connected to one end of the chain 92.

The apparatus of the present invention further comprises means for connecting the leading or forward end of the second frame assembly to the first frame in a manner providing a degree of movement of the leading end of the second frame assembly in a direction substantially perpendicular to the ground surface 12. In particular, the connecting means includes an element designated 140 in FIGS. 1 and 2 fixed at one end to the leading end of the second frame assembly and extending outwardly forwardly therefrom, in particular extending from the junction of the frame sections 74, 76. Element 140 carries a pin or rod element 142 which is disposed with the longitudinal axis thereof in a generally horizontal plane during use, i.e. in a plane substantially parallel to the surface 12. Pin 142 is received in an elongated slot 144 provided in frame member 152 and disposed in a substantially vertical direction, i.e. in a direction substantially perpendicular to surface 12. The width of slot 144 and the cross-section or diameter of pin 142 are such that pin 142 moves freely along slot 144 in opposite vertical directions as viewed in FIGS. 1 and 2. The length of slot 144 in a vertical direction is selected to give the desired degree of vertical movement of the forward or leading end of the second frame in a manner which will be described. The trailing end or rear end of the second frame assembly is operatively associated with guide means provided on the body of planter 14 for guiding vertical movement of the trailing or rear end of the second frame assembly. In particular, the guide means comprises a pair of spaced-apart, vertically disposed angle iron elements 148 and 150 which are fixedly secured to a laterally extending frame member 152 on the forward end of the machine 14. As shown in FIG. 3, the guide elements 148, 150 are located outwardly of the trailing ends of the frame sections 70 and 72, respectively, with the inner surface of each guide element 148, 150 being either in contact with or spaced a very short distance from the outer surface of the corresponding frame section 70, 72. Thus the elements 148 and 150 serve as guides for the corresponding frame sections 70 and 72 as the trailing ends thereof move in a direction toward and away from the surface of the ground 12. The guide elements are secured to the frame member 152 by suitable brackets and bolt and nut type fasteners designated 154.

The apparatus of the present invention further comprises a colter disc 158 rotatably carried by the frame means, in particular being rotatably carried by the second frame assembly. During operation of the apparatus as illustrated in FIG. 2, the colter disc 158 penetrates the ground 12 in a manner forming a slit or opening of very narrow width or thickness in the ground in a direction substantially parallel to the direction of travel of the apparatus along over the field as it is drawn by the tractor or vehicle. The slit or slice is substantially the same thickness as that of disc 158. The colter disc 158 also serves to cut old plant stalks and similar debris lodged in the ground 12 during formation of the slit in a manner which will be described. Preferably a plurality of colter discs are provided, one for each row to be prepared for seed planting, and in the device shown four colter discs 158a, 158b, 158c and 158d are carried by the frame in laterally spaced relation thereon. In this connection, the broken lines 160a, 160b, 160c and 160d in FIG. 3 represent four rows which are prepared for seeding as the apparatus moves along a field to be planted. Each of the colter discs 158 is in the form of a commercially available plow colter disc or rolling colter having slight ripples or corrugations around the periphery or circumference thereof and being of hardened steel. Typically each colter disc 158 has a diameter of about 17 inches, and each colter has a somewhat conically shaped hub 162 on one side of the disc generally centrally thereof.

Each of the colter discs 158 is rotatably carried by the second frame assembly by the following mounting arrangement. As shown in FIG. 5, an arm member 166 provided with a shaft-like extension 168 fixed at one end thereof which is rotatably connected to the corresponding colter disc. Near the opposite end of each arm 166, but spaced somewhat inwardly thereof, the arm is pivotally connected at 170 to the body of a bracket member 172. At a point nearer the end thereof the arm 66 is pivotally connected at 174 to one end of a spring 176, the opposite end of which is fixed to the body of the bracket member 172. Spring 176 functions as an absorber of shock force as the axis of the colter disc 158 moves in a direction perpendicular to the ground 12 causing generally horizontal movement of the point 174a as viewed in FIGS. 1 and 2. The bracket body 172, in turn, is connected to the second frame assembly in a manner providing pivotal movement about an axis disposed generally perpendicular to the plane of the frame. In particular, a rod-like element 180 extends from the bracket body 172 and is rotatably held in another bracket 182 which, in turn, is fixed to the frame member 80. A plurality of mounting arrangements including the foregoing components is provided, as shown in FIG. 3, one for each of the colter discs 158a–158d. Thus, each colter disc 158 has a limited degree of movement in a direction substantially perpendicular to the plane of the ground surface 12 and also has a limited degree of movement about an axis disposed generally perpendicular to the plane of the ground surface 12. This provides accommodation for obstructions such as sticks, stones and similar articles encountered by the colter disc 158 as it is forming the slice in the ground during movement of the apparatus along the field.

The apparatus of the present invention further comprises a pair of tooth elements 190, 192 which are carried by the frame means between the colter disc and the trailing end of the frame. The tooth elements 190, 192 depend from the frame means so as to engage the ground in a manner which will be described. One of the tooth elements, in particular tooth 190, is located near the colter disc and laterally offset a relatively small distance to one side of the slit formed by the disc as shown in FIG. 3. In other words, the end of tooth 190 which engages the ground is spaced laterally to one side of a plane coincident with the plane of disc 158. The other tooth element, in particular element 192, is located in longitudinally spaced relation along the frame means relative to the one tooth element 190. In addition, tooth element 192 is laterally offset a relatively small distance to the opposite side of the slit formed by the colter disc as shown in FIG. 3. In other words, the end of tooth 192 which engages the ground is spaced laterally to the opposite side of the plane coincident with the plane of disc 158. The tooth elements 190, 192 penetrate the ground on opposite sides of the slit formed by disc 158 and the teeth cut the ground in a manner forming a band-like region of ground disturbed or otherwise prepared to receive the particulate matter including seed dispensed by the planting machine 14 in a manner which will be described in detail presently.

In the device shown, a plurality of sets of tooth elements 190, 192 are carried by the frame means in association with each of the four colter discs corresponding to the four rows 160a–160d as shown in FIG. 3. Thus, teeth 190a, 192a are located in trailing relation to colter disc 158a, teeth 190b and 192b are located in trailing relation to colter disc 158b, teeth 190c and 192c are located in trailing relation to colter disc 158c, and teeth 190d and 192d are located in trailing relation to colter disc 158d. As shown in FIGS. 3 and 5, each of the tooth elements 190 and 192 is elongated and is relatively narrow in a direction substantially perpendicular to the direction of travel of the apparatus. As shown in FIGS. 1 and 2, each of the tooth elements 190 and 192 is carried by the second frame assembly so as to depend therefrom and each element is curved along the length thereof in a somewhat S-like fashion. Each of the tooth elements 190, 192 has an elongated end portion which curves in a direction first toward the ground surface 12 and then toward the leading end of the frame as shown in FIGS. 1 and 2. Each of the tooth elements 190, 192 is provided with a relatively narrow blade element 194 and 196, respectively, on the end thereof to facilitate cutting of the soil. Each of the tooth elements 190 and 192 and corresponding blades 194, 196 is relatively narrow in a direction substantially perpendicular to the slit formed by the corresponding colter disc, and each of the tooth elements is of a material having some resiliency preferably steel. The teeth 190, 192 can be of the type commercially available for use on tiller or cultivating equipment, and the blade elements 194, 196 which provide the narrow pointed ends preferably are of hardened steel and are bolted, riveted or otherwise secured to the ends of the tooth elements which engage the ground. The curved or substantially S-shape of the tooth elements 190, 192 together with the fact that the metal has some resiliency provides some spring-like action for shock absorbing when the teeth encounter rocks or similar obstructions.

The apparatus of the present invention further comprises at least one ground contacting wheel element rotatably connected to the frame for supporting the frame relative to the ground and simultaneously controlling the depth of penetration of the colter discs and tooth elements into the ground. Preferably a pair of wheel elements 200, 202 are rotatably connected to the second frame assembly. The location of each wheel elements 200 and 202, in particular the axis of rotation thereof, is between the tooth elements and the trailing end of the frame. In particular, the wheels 200, 202 is located between the trailing tooth element 192 and the trailing end of the frame. As shown in FIG. 3, each wheel element is laterally spaced from the band of prepared ground which is formed by a colter disc and the associated tooth elements. In particular wheel 200 is laterally spaced from both the rows 160a, 160b shown in FIG. 3 and, similarly, wheel 202 is laterally spaced from both the rows 160c and 160d. In the apparatus shown, the wheel elements 200, 202 are located on the frame such that the axes of rotation of the wheels are substantially coincident, i.e. longitudinally in alignment on the frame. There is also provided means for permitting adjustment of the connection of each wheel element to the frame in a direction toward and away from the ground surface 12. In particular, as shown in FIG. 5 wheel 200 is rotatably mounted in a member designated 206. A connecting member 208 is fixed to the wheel mounting member 206. The connecting member 208, in turn, is connected by suitable fasteners 210 at a selected location to a wheel mounting plate 212 which is fixed to the frame member 70. The wheel mounting member 212 has a series of vertically spaced apertures (not shown) for receiving the fastener 210 whereby the axis of rotation of wheel 200 can be adjusted in a direction perpendicular to ground surface 12. Similarly, wheel 202 is rotatably mounted in a member 214 to which a connecting member 216 is fixed and which, in turn, is connected by a fastener 218 to a wheel mounting plate 220 which is fixed to the frame 72. The plate 220 likewise has a series of vertically spaced apertures (not shown) in substantial alignment with the apertures on mounting plate 212 whereby the axis of rotation of wheel 202 can be adjusted relative to the surface of ground 12.

The apparatus of the present invention further comprises weight means carried by the frame near the colter discs for causing the discs and the tooth elements to penetrate the ground 12. In particular, the weight means comprises a rectangular shaped element 226 which, as shown in FIG. 3, is carried by the frame element 80 and is substantially centered longitudinally and laterally with respect to element 80. The weight element 226, which can be a body of metal, is fastened to frame element 80 by means of a bracket 228 and bolt and nut type fasteners 230.

The apparatus of the present invention can be used with various types of planting machines. The planting machine 14 shown fragmentarily in the drawings includes a pair of opposed side walls 236, 238 between which the frame element 152 extends. The planting machine is supported on ground surface 12 by a plurality of wheels, two of which are designated 240 and 242. The planter 14 carries a plurality of bins or receptacles, two of which are designated 244 and 246, for storing seed, fertilizer and the like for dispensing to the ground. A plurality of frame members 250a–250d extend downwardly along the front or leading end of planter 14 and are secured to frame member 152 by brackets 252a–252d and fasteners 254a–254d. The frame members 250a–250d are substantially in alignment with the rows designated 160a–160d, respectively, in FIG. 3 and can be associated with dispensing mechanisms on the planter 14. In the planter shown, a wheel element 260 controls the depth of penetration into the band of prepared ground of a furrow-forming disc-like element 262. Element 262 cooperates with a companion disc-like element (not shown), the two discs being angularly disposed, to form a V-shaped furrow. A seed discharging tube or conduit (not shown) is located between the discs to dispense seeds such as those designated 264 in FIG. 2 at regular intervals along the furrow. Another depth control wheel (not shown) can be provided on the opposite side of the arrangement. The foregoing arrangement is provided at laterally spaced locations on planter 14, in the planter shown in lateral registry with the rows 160a–160d. In other words, the arrangements of colter discs 158a–158d and teeth 190a–190d and 192a–192d are in lateral registry or alignment with the plurality of seed dispensing arrangements carried by the planting machine. The planter also can include dispensing means (not shown) for introducing fertilizer to each band or row of prepared ground near the seeds dispensed to the furrows. The planter also includes press wheels or firming wheels (not shown) to close the furrow after dispensing seeds thereto.

The ground preparing apparatus of the present invention is useable with a wide variety of planting machines. By way of example, it can be used with a John Deere Model 7000 four row plateless planter or with an International Model 56 planter.

Figures 6, 7, 8:
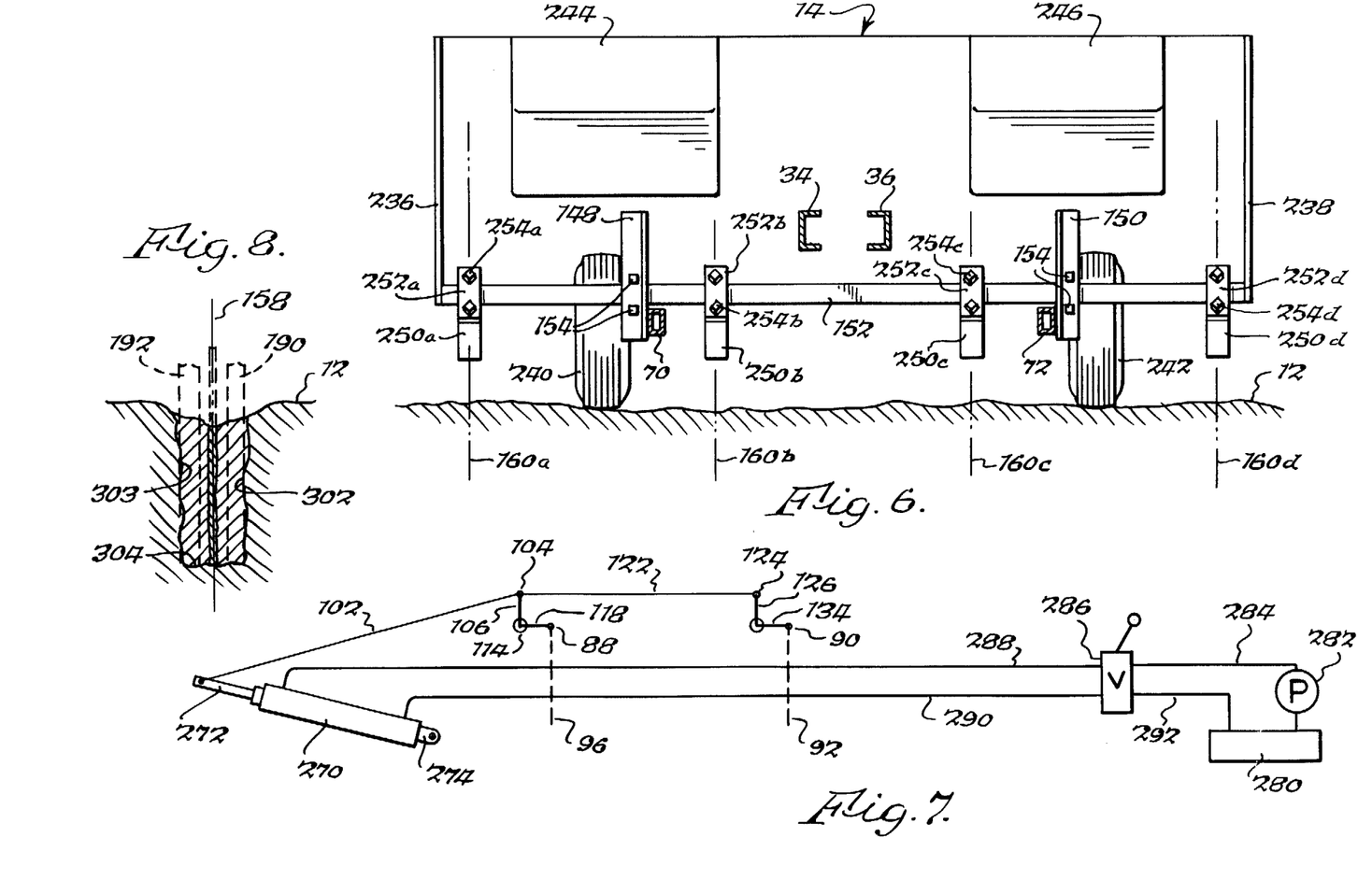
FIG. 6 is an end elevational view with parts removed taken about on line 6—6 of FIG. 3.
FIG. 7 is a schematic diagram of a motive power means for raising and lowering the frame assembly.
FIG. 8 is a diagrammatic view illustrating the operation of the apparatus of the present invention.

FIG. 7 is a schematic diagram of an hydraulic circuit for an hydraulic cylinder 270 serving as the source of motive power for the means for raising and lowering of the record frame assembly previously described. Cylinder 270 includes a reciprocable piston rod 272 extending from one end and is provided with a mounting bracket 274 at the opposite end. Cylinder 270 can be mounted at a convenient location on the apparatus 10 or on the planter 14. The rod 272 is pivotally connected to lever arm 102 whereby reciprocation of rod 272 by fluid action in cylinder 270 reciprocates arm 102. Hydraulic fluid for operating cylinder 270 is stored in a reservoir or tank 280 normally carried by the tractor or vehicle. The fluid is conveyed from tank 280 to cylinder 270 by means of a pump 282, the input of which is connected to tank 280 and the output of which is connected by a line 284 to one part of a fluid control valve 286. Pump 282 also normally is carried by the tractor or vehicle. Valve 286 is of the manually-operated type and is carried by the tractor or vehicle at a location conveniently accessible to the driver or operator. Another part of valve 286 is connected by a line 288 to one end of cylinder 270. The other end of cylinder 270 is connected by a line 290 to another part of valve 290, and fluid is returned from valve 286 to tank 280 through a line 292.

In one operative position of valve 286, fluid is conveyed through conduit 288 to the rod end of cylinder 270 and is withdrawn from the piston end thereof through conduit 290, all in a known manner. This retracts rod 272 moving arm 102 in a direction to the right as viewed in FIG. 7 and also in FIGS. 1 and 2. The joints 104 and 124 also are moved to the right as viewed in those figures with the result that the record frame assembly carrying colter discs 158, tooth elements 190, 192 and wheels 200, 202 is lowered relative to the ground surface 12, i.e. is moved in a direction toward and generally perpendicular to the ground surface 12. Valve 286 can have an intermediate or idling position whereby the frame can be held at a selected elevation in a conventional manner with such valves. In the other operative position of valve 286, fluid is conveyed through conduit 290 to the piston end of cylinder 270 and is withdrawn from the rod end thereof through conduit 288. This extends rod 272 moving arm 102 in a direction to the left as viewed in FIG. 7 and also in FIGS. 1 and 2. The joints 104 and 124 also are moved to the left with the result that the record frame assembly carrying colter discs 158, tooth elements 190, 192 and wheels 200, 202 is raised relative to the ground 12, i.e. is moved in a direction away from and generally perpendicular to the ground surface 12.

The ground preparing apparatus 10 of the present invention operates in the following manner. The leading or forward end of the frame is connected to drawbar 16 of the tractor or similar vehicle (not shown) and the trailing or rear end of the frame is connected to the drawbars 34, 36 of planting machine 14 as previously described. The operator manipulates valve 286 to raise the second frame assembly to the position shown in FIG. 1 in the manner described hereinabove. The colter discs 158, tooth elements 190, 192 and wheels 200, 202 thus are clear of the ground or other surface supporting the tractor and planter 14. Then the tractor is driven to pull the apparatus 10 and planter 14 to a field which is to be prepared and seeded. The combination is moved into position at the location of the field where ground preparation and seeding is to be started. Then the operator manipulates valve 286 to lower the second frame assembly to the position shown in FIG. 2 wherein the colter discs 158, tooth elements 190, 192 and wheel elements 200, 202 penetrate the ground. In particular, the second frame assembly is lowered to the extreme lowerment position where the chains 92, 96 and 98 are in a slackened or loose condition. The weight 226 together with the weight of the second frame assembly urges the colter discs and tooth elements into the ground, and as the tractor moves forwardly to draw the apparatus 10 therewith the colter discs 158 and tooth elements 190, 192 penetrate further into the ground. The depth of penetration of colter discs 158 and tooth elements 190, 192 is controlled or limited by the wheels 200, 202. In addition, the relative depth of penetration between colter discs 158 and the tooth elements can be varied by adjustment of the mountings of the colter discs previously described. According to a preferred mode of the present invention, each of the tooth elements 190, 192 penetrate a distance of about 4–5 inches into the ground and each of the colter discs 158 penetrates a distance of about 2–4 inches into the ground.

The tractor or vehicle is driven along the field thereby drawing the apparatus 10 along over the ground. As the colter discs 158 rotate and cut the ground to form a slit or slice therein, the discs 158 also cut any plants stalks or stems 300, for example corn stalks, remaining in the ground from the previous planting season. The discs also cut sticks or other articles and the circumferential flutes or ripples in the colter discs 158 roll or push away stones and the like debris. Any large or relatively immovable objects cause pivoting of the colter discs 158 about the vertical axis of the mounting arrangement as previously described. Any shock or impact forces on colter discs 158 due to contact with corn obstructions are absorbed by the spring mounting arrangement. Thus the first phase or stage in the ground preparation provided by the apparatus 10 is formation of the narrow slit or slice by the colter disc 158 in preparing the ground for operation by the tooth elements 190, 192 which trail the colter disc 158. A plurality of slits are cut in the ground as apparatus 10 moves therealong, one for each row to be prepared and seeded, and in the apparatus shown four slits are formed simultaneously.

As the tooth elements 190, 192 penetrate the ground and move with the apparatus 10 through the ground they cut the ground on adjacent sides of the slit or slice formed by the colter disc. This provides a disturbed or loosened region of soil bounded by opposed side surfaces 302, 303 indicated in FIGS. 2 and 8 and a bottom or base surface. The width of the prepared or plowed-like region of soil between surfaces 302, 303 is relatively narrow thereby resulting in a narrow band-like region of prepared ground for each row as the apparatus 10 moves along the field. It is important that each of the tooth elements 190, 192 be relatively narrow in a direction substantially perpendicular to the direction of travel of apparatus 10. If the teeth were relatively wide this would result in an excessive amount of soil being diverted from the prepared region which is not desired. According to a preferred mode of the present invention, each of the tooth elements 190, 192 has an operative surface of a width of about 1.5 inches measured in a direction substantially perpendicular to the direction of travel of apparatus 10. The lateral spacing of the tooth elements is about 3 inches measured point to point. The foregoing results in a width of about 4 inches for the band of prepared ground measured between the surfaces 302, 303 in FIG. 8. A plurality of bands of prepared ground result as the apparatus 10 moves along the field, in the apparatus shown four bands corresponding to the four rows designated 160a-160b in FIG. 3, with the typical lateral spacing between rows being about 30 inches.

The longitudinal spacing between tooth elements 190, 192 is sufficient to allow any debris encountered by the first tooth element 190 to move about the first tooth and then pass between the tooth elements 190, 192 in a manner preventing clogging or lodging of debris between tooth elements 190, 192. According to a preferred mode of the present invention the longitudinal spacing between tooth elements 190, 192 is about 16 inches.

The bands or narrow regions of prepared ground made by the apparatus 10 are in forward or leading alignment with the plurality of dispensers carried by planter 14. The dispensers form furrows in the bands of prepared soil and dispense seeds and possibly also fertilizer to the furrows whereupon the furrows are closed in a manner previously described. After the combination of tractor, apparatus 10 and planter 14 has moved in one direction the full dimension of the field being prepared and seeded, the operator turns the combination around and proceeds in a return direction to prepare and seed the next plurality of rows. During turning around of the combination, the second frame assembly can be raised or elevated to the position of FIG. 1 to facilitate turning whereupon the frame is again lowered.

The ground preparing apparatus 10 of the present invention is particularly advantageous in planting of corn seeds, but it also can be used in seed planting of beans, soybeans and any other seeds for which a corn-type planter can be used. The apparatus 10 is advantageously effective in preparing relatively hard ground in no-till planting. In addition, the apparatus 10 is advantageously effective in preparing non-uniform ground in no-till planting. Such non-uniform conditions can include hard and soft ground and wet and dry ground. For example, the apparatus 10 effectively goes through and prepares relatively wet soil with no difficulty. As a result, there is no need to wait for a field to dry in order to prepare and seed. The ground preparing apparatus 10 can be used in field conditions where conventional plowing can't be done.

The location of the depth control wheels 200, 202 in trailing relation to the tooth elements 190, 192 and in trailing relation to the colter discs 158 is important in preventing the tooth elements 190, 192 from being raised or moved out of the ground an excessive amount when the wheels 200, 202 encounter obstructions, mounds, or other uneven surfaces. The connection of the forward or leading end of the frame providing a degree of movement of the leading end in a direction substantially perpendicular to the ground 12, in particular the connection of the leading end of the second frame assembly to the first frame assembly by means of pin 142 movable along slot 144, is important in preventing excessive raising of the entire frame including colter discs and teeth when ground unevenness or obstructions are encountered and in avoiding damage to the colter discs under such conditions. The second frame assembly in effect floats at both leading and trailing ends during operation of the apparatus. The vertical adjustment of the depth control wheels 200, 202 is important in providing the capability of accommodating different field conditions or differences in the nature or characteristics of the tooth elements.

It is therefore apparent that the present invention accomplishes its intended objects. While a single embodiment of the present invention has been described in detail, this is for the purpose of illustration, not limitation.

I claim:

1. Apparatus for preparing ground for seed planting adapted to be drawn over along a field by an agricultural vehicle along with and forwardly of a planting machine, said apparatus comprising:
   (a) a first frame adapted to be connected at one end to said vehicle and at an opposite end to said planting machine;
   (b) a second frame having a leading end near said vehicle and a trailing end near said planting machine;
   (c) holding means connected to said first and second frames for supporting said second frame by said first frame in a manner permitting limited movement of said second frame in a direction toward and away from the ground;
   (d) a colter disc rotatably carried by said second frame, said disc penetrating the ground in a manner forming a slit in the ground in a direction substantially parallel to the direction of travel of said apparatus along the field, said colter disc serving to cut plant stalks and the like debris during formation of the slit;

(e) first and second tooth elements carried by said second frame between said colter disc and said trailing end of said second frame, said first tooth element being located near said colter disc and laterally offset a relatively small distance to one side of the slit formed by said disc, said secnd tooth element being longitudinally spaced from said first tooth element and laterally offset a relatively small distance to the opposite side of the slit formed by said disc, the longitudinal spacing between first and second tooth elements being sufficient to allow any debris encountered by said first tooth element to move between said tooth elements in a manner preventing clogging of said tooth elements, said tooth elements penetrating the ground on opposite sides of the slit and cutting the ground in a manner forming a band-like region of prepared ground disposed substantially parallel to the direction of travel of said apparatus for receiving particulate matter including seed dispensed by said planting machine;

(f) at least one ground contacting wheel element rotatably connected to said second frame, said wheel element laterally spaced from the band formed by said colter disc and said teeth, said wheel element controlling the depth of penetration of said colter disc and said tooth elements into the ground; and (g) means for connecting said leading end of said second frame to said first frame in a manner providing a degree of movement of said leading end of said second frame in a direction substantially perpendicular to the ground, said connecting means comprising means defining a slot in said first frame and a pin carried by said leading end of said second frame and movable along said slot in said first frame.

2. Apparatus according to claim 1, wherein each of said tooth elements has an end portion curved in a direction first toward the ground and then toward said leading end of said frame means.

3. Apparatus according to claim 1, wherein each of said tooth elements is of a material having a degree of resiliency.

4. Apparatus according to claim 1, further including additional sets of colter discs and pairs of tooth elements, said sets of discs and tooth elements being spaced laterally of the direction of travel of said apparatus along the field.

5. Apparatus according to claim 4, further including another ground contacting wheel element, said wheel elements being connected to said frame means in substantial alignment longitudinally of said frame means, said wheel elements being laterally spaced from said sets of colter discs and tooth elements.

6. Apparatus according to claim 1, wherein said holding means comprises:
(a) motive means carried by said first frame and having an output providing motion in two directions; and
(b) flexible coupling means connected to the output of said motive means and connected to said second frame whereby in response to operation of said motive means said second frame can be moved toward and away from the ground.

7. Apparatus according to claim 1, wherein said ground contacting wheel element is located between said second tooth element and said trailing end of said frame.

8. Apparatus according to claim 1, further including weight means carried by said second frame near said colter disc for aiding said disc and said tooth elements in penetrating the ground.

9. Apparatus according to claim 1, wherein said tooth elements penetrate deeper into the ground than said colter disc.

10. Apparatus according to claim 1, further including means permitting adjustment of the connection of said wheel element to said second frame in a direction toward and away from the ground.

* * * * *